(12) United States Patent
Kaliamoorthy et al.

(10) Patent No.: US 12,738,972 B2
(45) Date of Patent: Sep. 15, 2026

(54) SCHEDULER AND METHOD OF SCHEDULING SESSIONS IN A UWB COMMUNICATIONS SYSTEM

(71) Applicant: NXP B.V., Eindhoven (NL)

(72) Inventors: Ganesan Kaliamoorthy, Bangalore (IN); Yuvaraj Pargunam, Dharmapuri (IN)

(73) Assignee: NXP B.V., Eindhoven (NL)

( * ) Notice: Subject to any disclaimer, the term of this patent is extended or adjusted under 35 U.S.C. 154(b) by 15 days.

(21) Appl. No.: 18/937,796

(22) Filed: Nov. 5, 2024

(65) Prior Publication Data

US 2025/0192820 A1 Jun. 12, 2025

(30) Foreign Application Priority Data

Dec. 7, 2023 (IN) ............................ 202341083521

(51) Int. Cl.
*H04B 1/7163* (2011.01)

(52) U.S. Cl.
CPC ................................ *H04B 1/7163* (2013.01)

(58) Field of Classification Search
CPC ... H04B 1/7163; G06F 9/4881; G06F 9/5005; H04W 72/12; H04W 28/14; H04W 72/535
See application file for complete search history.

(56) References Cited

U.S. PATENT DOCUMENTS

2023/0170933 A1* 6/2023 Lee ........................ G01S 13/765 375/130
2023/0283319 A1* 9/2023 Lim ...................... G01S 13/767

FOREIGN PATENT DOCUMENTS

WO 2023163924 A1 8/2023
WO 2023164634 A1 8/2023

OTHER PUBLICATIONS

Charlier, Maximilien et al.; "Scheduling UWB Ranging and Backbone Communications in a Pure Wireless Indoor Positioning System"; MDPI Journals IOT, vol. 3, Issue 1; Published Mar. 2, 2022; https://doi.org/10.3390/iot3010013.

* cited by examiner

*Primary Examiner* — David S Huang

(57) ABSTRACT

A method of scheduling sessions in an Ultra-wideband, UWB, communications system, and a corresponding computer program, scheduler and UWB communications system. The method includes using a predictive scheduling algorithm to produce a predicted order of appearance of a plurality of UWB sessions in a UWB session sequence. The method also includes storing the predicted order in a buffer. The method further includes performing a plurality of iterations of: on completion of a preceding UWB session in the UWB session sequence, inspecting the buffer to determine a next UWB session in the UWB session sequence; and initiating that next UWB session.

20 Claims, 5 Drawing Sheets

SCHEDULER AND METHOD OF SCHEDULING SESSIONS IN A UWB COMMUNICATIONS SYSTEM

CROSS-REFERENCE TO RELATED APPLICATIONS

This application claims the priority under 35 U.S.C. § 119 of India Patent application no. 202341083521, filed on 7 Dec. 2023, the contents of which are incorporated by reference herein.

DESCRIPTION

Field

This disclosure relates to a method of scheduling sessions in an Ultra-wideband, UWB, communications system. This disclosure also relates to a computer program and to a scheduler for performing the method. This disclosure further relates to Ultra-wideband, UWB, communications system comprising the scheduler.

Background

As Ultra-wideband (hereinafter, UWB) technology becomes more popular, the need for supporting a diverse range of UWB use cases is increasing. For instance, for some applications, this has led to a requirement to enable multiple UWB sessions to be supported concurrently.

A problem in the implementation of applications requiring multisession UWB scenarios is the scheduling time of those sessions. UWB scheduling times can depend on many parameters such as a need to evaluate the dynamic priorities of the various sessions, and a need to ensure that any particular preconditions for scheduling individual sessions are met. The task of scheduling the sessions, while factoring in conditions of the kind noted above, may be performed by a scheduler. Typically, the scheduling of a next session is conducted once a previous session has concluded. To accommodate the time required for the scheduler to schedule a next session, plus the time taken to perform any session initiation actions, a time gap may be reserved between adjacent sessions.

During operation, the time taken by the scheduler to schedule a next session is proportional to the remaining number of sessions to be evaluated. As a consequence, if the number of sessions to be evaluated is large, then the time gap reserved on air between two consecutive sessions may be corresponding large. This is not the efficient use of UWB airtime.

SUMMARY

Aspects of the disclosure are set out in the accompanying independent and dependent claims. Combinations of features from the dependent claims may be combined with features of the independent claims as appropriate and not merely as explicitly set out in the claims.

According to an aspect of this disclosure, there is provided a method of scheduling sessions in an Ultra-wideband, UWB, communications system, the method comprising:

- using a predictive scheduling algorithm to produce a predicted order of appearance of a plurality of UWB sessions in a UWB session sequence;
- storing the predicted order in a buffer; and
- performing a plurality of iterations of:
  - on completion of a preceding UWB session in the UWB session sequence, inspecting the buffer to determine a next UWB session in the UWB session sequence; and initiating said next UWB session.

Embodiments of this disclosure can make the scheduling of UWB sessions in a UWB session sequence more efficient by predicting, in advance, the order of appearance of the UWB sessions in the sequence. Following this approach, a scheduler can avoid the need, after the completion of each and every UWB session in the sequence, to evaluate all of the remaining sessions in a sequence to determine which UWB session should be the next in the sequence. Instead, the scheduler can inspect the buffer containing the predicted order, which may allow the time gap between neighboring UWB sessions in the UWB session sequence to be reduced.

The method may include producing the predicted order during the session time of a UWB session. Accordingly, the scheduling method can take advantage of any idle time that is present within a given UWB session to perform the predictive scheduling algorithm.

The predictive scheduling algorithm may be run in a real-time operating system, RTOS, thread that has a lower priority than at least one functional thread of the UWB communications system. Assigning the predictive scheduling algorithm a lower priority than other functional threads can allow the predictive scheduling algorithm to be implemented without interrupting the operation of those other functions, which may be the primary function of the UWB session sequence. The at least one other functional thread may be a ranging thread of the UWB system.

The inspection of the buffer and the initiating of the next UWB session may be performed in a time gap located between completion of the preceding UWB session and commencement of the next UWB session. Since no actual evaluation of the remaining UWB sessions in the UWB session sequence is required to take place in the time gap, the duration of the size gap may be reduced.

Initiating said next UWB session comprises at least one of:

- resetting a modem of the UWB communications system;
- changing a channel to be used for transmission/reception by the next UWB session in response to a determination that the next UWB session requires a different channel to be used than a channel used by the preceding UWB session; and
- preparing a transmitter and/or receiver of the UWB communications system.

Various approaches may be used to determine how far ahead the predictive scheduling algorithm should operate. On the whole, a balance may be found between not predicting far enough ahead, in which case some of the benefit of the predictive approach may be lost, and predicting too far ahead, in which case the probability of an incorrect prediction increases. Incorrect predictions may require the buffer to be flushed and re-filled.

The method may further include, prior to determining the predicted order, determining a number, N, of predicted UWB sessions to include in the predicted order. N may be determined according to an expected number of UWB sessions required for the task that is to be implemented by the UWB session sequence. N may be determined according to an anticipated proportion of incorrect predictions for the plurality of UWB sessions in the UWB session sequence.

Determining the predicted order may include adding predicted UWB sessions to the predicted order until the number of predicted UWB sessions in the predicted order reaches N, or until a condition is reached in which a run time of a next predicted UWB session cannot be determined.

Determining the predicted order may include determining a start time of at least one predicted UWB session in the predicted order according to a start time and a run time of at least one preceding predicted UWB session in the predicted order.

The method may further include flushing the buffer and producing a new predicted order in response to a determination that:

- an actual next UWB session in the UWB session sequence differs from a next predicted UWB session in the predicted order;
- a new UWB session is to be added to the UWB session sequence;
- a UWB session is to be removed from the UWB session sequence; or
- a runtime of one of more UWB sessions in the UWB session sequence has changed.

The buffer may be a circular buffer. This can allow the buffer to be refreshed on an ongoing basis.

According to another aspect of this disclosure, there is provided a computer program comprising program instructions which, when executed by a scheduler, cause the scheduler to perform the method set out above.

According to a further aspect of this disclosure, there is provided a scheduler operable to schedule sessions in an Ultra-wideband, UWB, communications system by performing the method set out above.

According to another aspect of this disclosure, there is provided an Ultra-wideband, UWB, communications system comprising the scheduler set out above.

For the purposes of this disclosure, Ultra-wideband (UWB) technology refers to a radio technology for transmitting information spread over large bandwidth (~500 MHz), in carrier frequency range from 3-10.6 GHz. UWB uses short pulses with a large bandwidth at very low power spectral densities. UWB technology is widely used for ranging purposes. UWB technology supports different use cases, secure ranging for car access, door lock access, indoor localization, advertisement, data streaming and radar. These use cases may be active simultaneously in a UWB enabled device.

BRIEF DESCRIPTION OF THE DRAWINGS

Embodiments of the present disclosure will be described hereinafter, by way of example only, with reference to the accompanying drawings in which like reference signs relate to like elements and in which.

DETAILED DESCRIPTION

Embodiments of the present disclosure are described in the following with reference to the accompanying drawings.

Figure 1:
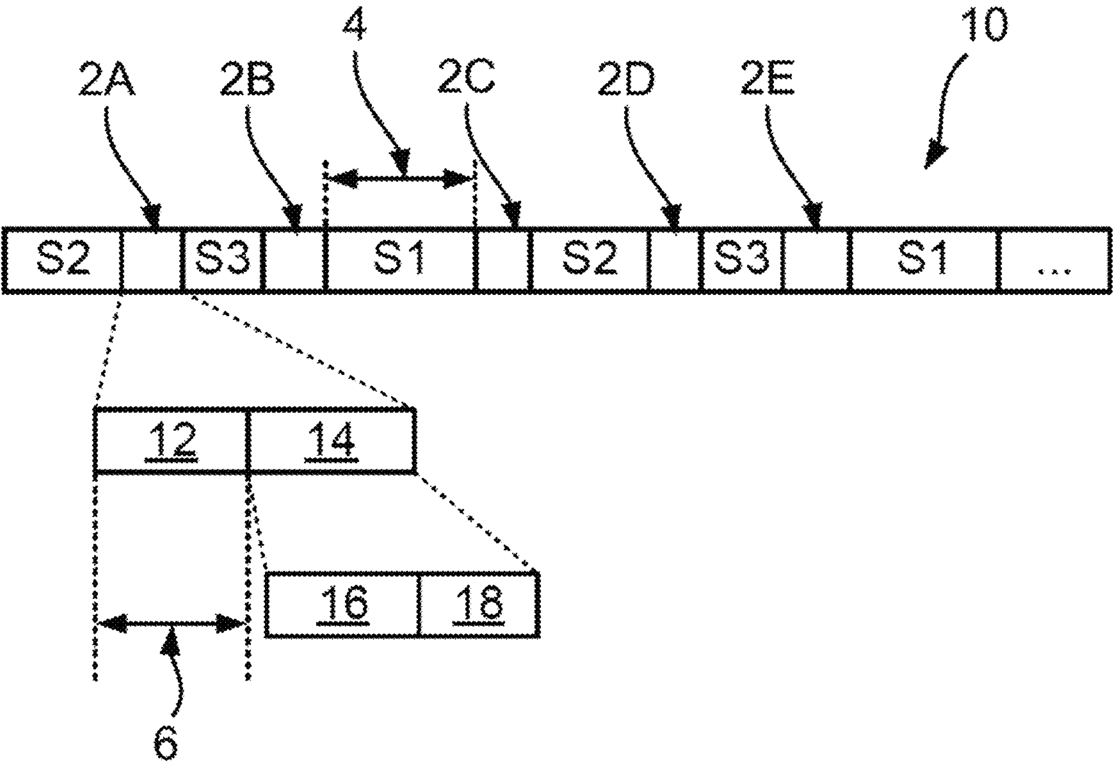
FIG. 1 shows an example of a conventional scheduling method in a radio communications system.

FIG. 1 shows an example of conventional scheduling in a radio communications system (e.g., a UWB system). The scheduling concerns a sequence 10 comprising a plurality of sessions S2, S3, S1, S2, S3, S1 . . . with a gap 2A, 2B, 2C, 2D, 2E . . . located between each pair of neighboring sessions in the sequence 10. Each session S has an associated session run time (duration) 4.

The gaps 2 between each pair of neighboring sessions are associated with the time taken for the scheduler to choose and schedule the next session in the sequence 10. This part of the gap may be referred to as the scheduler time 12 and has a duration 6. The gaps 2 between each pair of neighboring sessions are also associated with a session start offset time 14, which itself includes the time taken 16 to reset the modem for the session and/or to change to the channel to be used for the next session (assuming the channel to be used for the next session S is a different channel to that which was used for the preceding session), plus any other preparation time 18 for the Tx/Rx processes for the next session to be prepared. This preparation time 18 is generally hardware limited.

In a multisession scenario of the kind shown in FIG. 1, the duration 6 of the scheduler time 12 typically scales linearly with the number of sessions in the sequence 10 and is typically measured in milliseconds (by way of example, a typical duration of each gap 2 is around 2 milliseconds for a sequence comprising 8 sessions). In view of this, the worst-case scheduler time is usually reserved between neighboring sessions, considering the maximum number of sessions supported by the system (so as to take into account the fact that sessions may be added or deleted in the sequence 10). This results in underutilization of radio communications (e.g., UWB) airtime which, in turn, results in reduced throughput and higher latency for data transfer and streaming use cases.

In accordance with embodiments of this disclosure, noting that the duration of the preparation time 18 part of each gap 2 is difficult to achieve as is generally hardware limited, steps may be taken to reduce the scheduler time 12 (i.e., to shorten the duration 6), thereby to reduce the overall delay caused by each gap 2.

Figure 2:
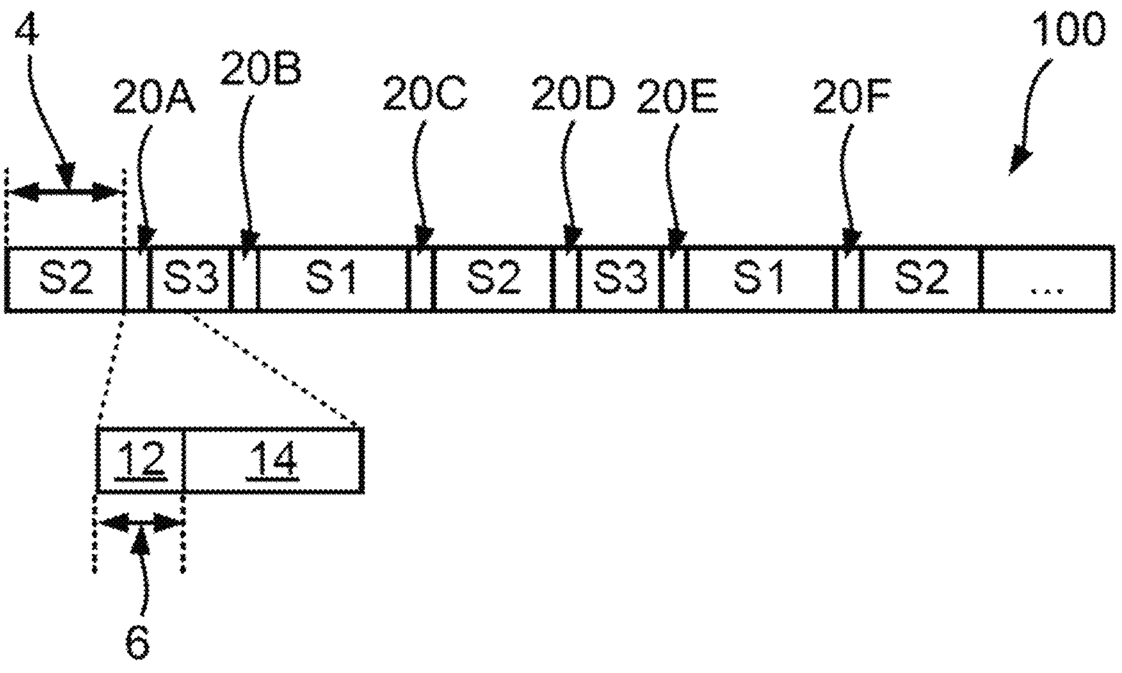
FIG. 2 shows the scheduling of sessions in a radio communications system according to an embodiment of this disclosure.

FIG. 2 shows the scheduling of sessions in a radio communications system according to an embodiment of this disclosure. The radio communications system may, for instance, be a UWB system. The scheduling in FIG. 2 concerns a session sequence 100 comprising a plurality of sessions S2, S3, S1, S2, S3, S1, S2 . . . with a gap 20A, 20B, 20C, 20D, 20E, 20F . . . located between each pair of neighboring sessions in the sequence 100. Each session S has an associated session run time (duration) 4.

As shown in FIG. 2, each gap 20 is associated with a scheduler time 12 and a session start offset time 14.

The session start offset time 14 may comprise similar or the same components as those described above in relation to FIG. 1. Hence, the session start offset time 14 may include the time taken to reset the modem for the session and/or to change to the channel to be used for the next session (assuming the channel to be used for the next session S is a different channel to that which was used for the preceding session), plus any other preparation time for the Tx/Rx processes for the next session to be prepared.

In accordance with embodiments of this disclosure, the scheduler time 12 component of each gap 20 has a duration 6. As noted above, in accordance with embodiments of this disclosure, steps are taken to allow the duration 6 shown in FIG. 2 to be shorter than the duration 6 described above in relation to FIG. 1. In particular, the scheduling activities of the system may be decoupled from the scheduling decision making process, which may make the scheduling methodology scalable to any number of sessions. By way of example only, embodiments of this disclosure may allow the duration 6 of the scheduler time 12 to be reduced to around 100 microseconds or less. Embodiments of this disclosure may also allow the duration 6 of the scheduler time 12 to be made independent of the maximum number of sessions supported by the system, and also independent of the actual number (N) of sessions in the sequence 100.

Figure 5:
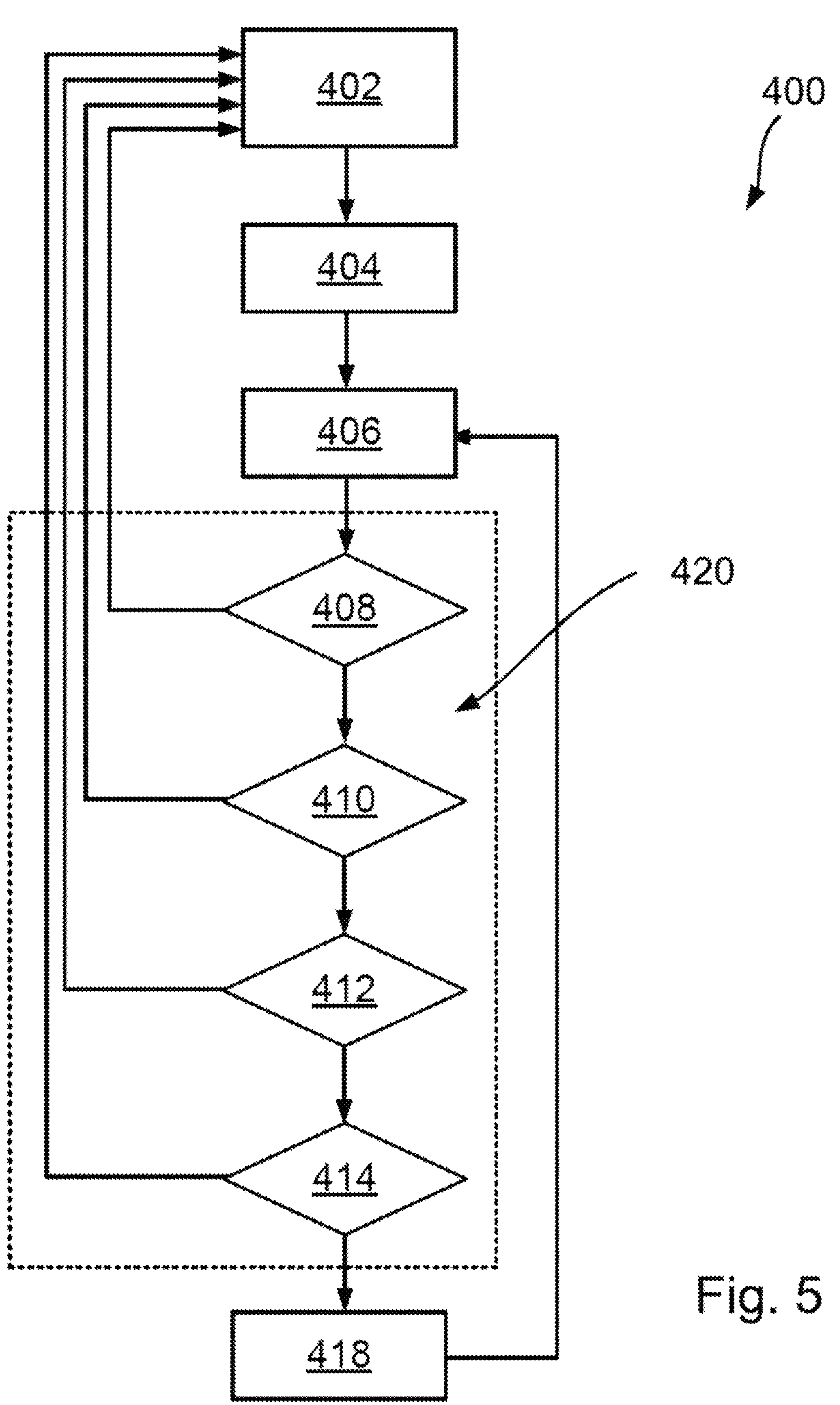
FIG. 5 shows a method of scheduling sessions in a radio communications system according to an embodiment of this disclosure.

Turning now to FIG. 5, a method 400 of scheduling sessions in a radio communications system (e.g., a UWB system) according to an embodiment of this disclosure will now be described.

The method 400 begins at step 402, in which the system uses a predictive scheduling algorithm to produce a predicted order of appearance of a plurality of UWB sessions S in a UWB session sequence 100 of the kind shown in FIG. 2.

In some embodiments, the predictive scheduling algorithm can be run during the session time of a session S in the sequence 100. For instance, the predictive scheduling algorithm may be run during a first session S in the sequence (e.g., during session S2 at the start of the sequence 100 shown in FIG. 2). In this way, the predicted order can be made available for the second and subsequent sessions in the sequence. In another example, the predictive scheduling algorithm may be run during the session time of any particular session in the sequence, particularly in the event of a buffer flush operation of the kind described below in relation to the optional steps 420. It is also envisaged that the predictive scheduling algorithm prior to the commencement of the sequence 100 or, during one of the gaps 20 between neighboring sessions.

The ability of the system to run the predictive scheduling algorithm during the session time of a session S is based on the recognition that the system may encounter idle periods during any given session. These idle periods can be utilized to allow the system to allocated processing resources to running the predictive scheduling algorithm. This can allow the predicted order to be produced in a manner that does not impinge upon the durations 6 of the scheduler times 12. In this way, the lengths of the gaps 20 may be reduced compared to the situation in, for example, FIG. 1. To implement this, in some embodiments, the predictive scheduling algorithm can be run in a real-time operating system (RTOS) thread that has a lower priority than other functional threads such as a ranging thread of the (e.g., UWB) communications system. Accordingly, the predictive scheduling algorithm may be run during any idling times of other higher priority threads (such as the ranging thread). This can allow the predictive scheduling algorithm to run concurrently with the other functional thread(s) (e.g., the ranging thread), without impacting on the operation of those threads.

In a next step 404, the predicted order of appearance of the plurality of UWB sessions S in the UWB session sequence 100 is stored in a buffer. The buffer may be a circular buffer, as will be described below. As with step 402, it is envisaged that the writing of the predicted order to the buffer may be performed during the session time of a session S and all of the benefits noted above in that respect may be also apply to step 404.

The method 400 next involves a number of iterations, which may be performed until the sequence 100 is ended. Each iteration may include the following steps.

In a first step 406 of each iteration, on completion of a preceding (e.g., UWB) session S in the session sequence 100, the scheduler inspects the buffer so as to determine a next session S in the session sequence 100. The method 400 may also include initiating and performing the first session (S2 in the example of FIG. 2) in the sequence 100, prior to commencing the iterations described here. In that case, the "preceding session" for the first iteration described here would be the first session S in the sequence 100.

In a second step 418 of each iteration, having determined the next session in the sequence 100 by inspecting the buffer, the system may initiate that next session. Initiating the next session may involve steps such as:

- resetting a modem of the communications system as described already above;
- changing a channel to be used for transmission/reception by the next session S in response to a determination that the next session S requires a different channel to be used than a channel used by the preceding session S as also described above; and/or
- preparing a transmitter and/or receiver of the communications system as further described above.

As shown in FIG. 5, after step 418 is completed, the method may return to step 406, so as to commence the next iteration.

Figure 3:
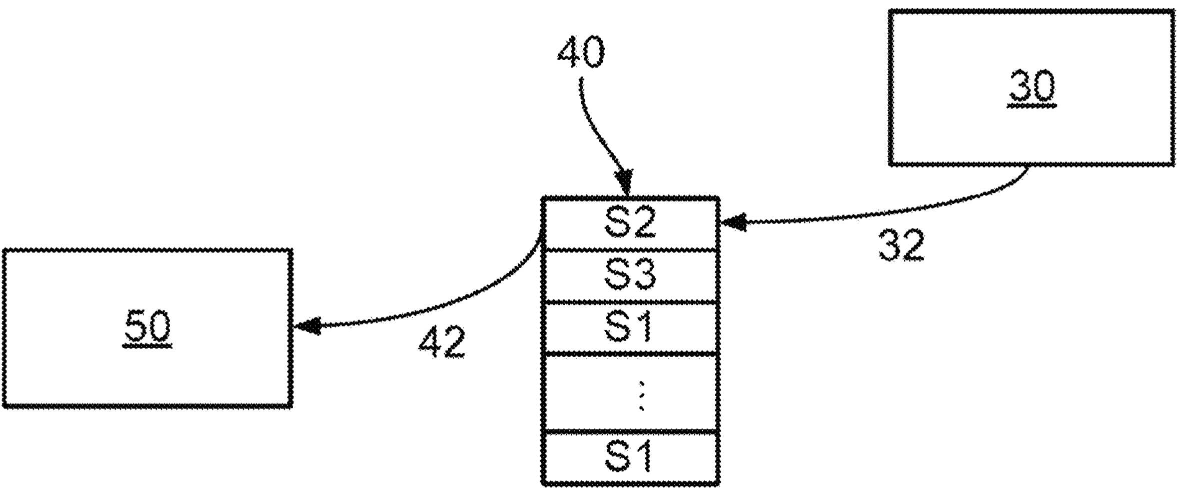
FIG. 3 illustrates the predictive nature of a scheduling method according to an embodiment of this disclosure.

Steps 402, 404, 406 and 418 are also summarized in FIG. 3, which shows the predictive scheduling algorithm 30 writing 32 a predicted order into a buffer 40, which may be a circular buffer. FIG. 3 also shows the scheduler 50 inspecting the buffer by reading 42 a next session from the buffer 40. The predicted order may, in addition to identifying the next session, also include further information such as a start time for each session in the predicted order. In some embodiments, the scheduler initiates the next schedule if certain pre-conditions are met. These pre-conditions may include that the start time matches or is compatible with the current time and/or the conditions set out in one or more of the optional steps 420 to be described below do not require a buffer flush.

In accordance with embodiments of this disclosure, the inspection of the buffer in step 406 and the initiating of the next session S of step 418 may be performed in each time gap 20 located between completion of the preceding session S and commencement of the next session S.

In accordance with embodiments of this disclosure, since the computational overhead associated with inspecting the buffer (and also with optionally checking whether any buffer flush operations of the kind described below in relation to the optional steps 420) is lower than that of the operations involved in the scheduling time 12 shown in FIG. 1, the during 6 of the scheduling time 12 may be shortened. The lower computational overhead arises because the scheduler is not required, during each scheduling time 12 (as in FIG. 1) to determine and prioritize each remaining session S in the sequence 100 and subsequently identify a next session. Instead, the scheduler can simply inspect the buffer to identify the session S and can optionally perform checks to ensure that the predicted order is correct.

In some embodiments, the method may also include some optional steps 420, which are aimed at handling changes to the sequence 100 which require the buffer to be flushed and a new predicted order (of the remaining sessions S in the sequence 100) to be produced.

In one optional step 408, the method 400 makes a determination as to whether an actual next session S in the session sequence 100 differs from a next predicted session S in the predicted order produced by the predictive scheduling algorithm in step 402. In response to a determination that the actual next session matches the next predicted session, the method 400 may continue to a next one of the optional steps 420 and/or to step 418. On the other hand, in response to a determination that the actual next session S differs from the next predicted session S, the method may involve flushing the buffer and returning to step 402, in which a new predicted order (for the remaining sessions S in the sequence 100) can be produced. The new predicted order may include the different next session S.

In another optional step 410, the method 400 makes a determination as to whether a new session S is to be added to the session sequence 100. The new session S may be a next or a subsequent session in the sequence 100. Where the new session S is a next session S in the sequence 100, step 408 described above may also apply. In response to a determination that no new session(s) S are (at this stage) to be added to the session sequence 100, the method 400 may continue to a next one of the optional steps 420 and/or to step 418. On the other hand, in response to a determination that a new session S is to be added to the session sequence 100, the method 400 may involve flushing the buffer and returning to step 402, in which a new predicted order (for the remaining sessions S in the sequence 100) can be produced. The new predicted order may include the new session S.

In another optional step 412, the method 400 makes a determination as to whether a session S is to be removed from the session sequence 100. The session S to be removed may be a next or a subsequent session in the sequence 100. Where the session S to be removed is a next session S in the sequence 100, step 408 described above may also apply. In response to a determination that no session(s) S are to be removed (at this stage) from the session sequence 100, the method 400 may continue to a next one of the optional steps 420 and/or to step 418. On the other hand, in response to a determination that a session S is to be removed from the session sequence 100, the method 400 may involve flushing the buffer and returning to step 402, in which a new predicted order (for the remaining sessions S in the sequence 100) can be produced. The new predicted order may omit the removed session S.

In a further optional step 414, the method 400 makes a determination as to whether a runtime of one or more of the session S in the session sequence 100 has changed. The session(s) S with altered runtimes may include a next or a subsequent session in the sequence 100. In response to a determination that no session runtimes have changed the method 400 may continue to a next one of the optional steps 420 and/or to step 418. On the other hand, in response to a determination that one or more session runtimes have changed, the method 400 may involve flushing the buffer and returning to step 402, in which a new predicted order (for the remaining sessions S in the sequence 100) can be produced. The new predicted order may take into account the updated session runtimes.

It will be appreciated that the method 400 may include any combination of one or more of the optional steps 420. Moreover, the optional steps 420 may be omitted from the method altogether. The optional steps 420 may be performed at run time, as the system moves through each stage in the sequence 100, thereby allowing real time changes in the sequence 100 to be accommodated.

It is recognized that buffer flush operations, along with the re-running of the predictive scheduling algorithm may lead to delays in the commencement of a next session S in the sequence 100, in the event that any of the optional steps 420 do lead to such operations. Nevertheless, it is anticipated that overall, embodiments of this disclosure can reduce the durations of the gaps 20, hence improving airtime utilization. Moreover, as will now be described, embodiments of this disclosure can include features that can allow the potential need for buffer flush operations to be reduced to acceptable levels.

In accordance with embodiments of this disclosure, the predicted order may only relate to a subset of sessions S within the overall sequence 100. By way of example, the predicted order may relate to a next N sessions S in the sequence 100. In some embodiments, the system can attempt (subject to processing overhead availability) to perform steps 402 and 404 to produce and subsequently update the predicted order of N next sessions on an ongoing basis. In some cases, processing time may not be available during each and every session S. Nevertheless, it is anticipated that enough sessions in the sequence 100 will have sufficient idling time available to allow the predictive scheduling algorithm to top up the buffer such that the buffer rarely, if ever, falls empty.

In some embodiments, prior to determining the predicted order, the predictive scheduling algorithm may determine a number, N, of predicted sessions to include in the predicted order. The choice of N may factor in a number of considerations. For instance, a larger value of N may increase to probability of buffer flush operation being required. This is because for a large N, it becomes increasingly likely that, within the next N sessions:

- one of the predicted sessions may not turn out to be the actual next session;
- a session may need to be added/removed to/from the sequence 100; and/or
- a run time of one or more of the next N sessions may change.

On the other hand, if N is too low, then the likelihood of the buffer running empty increases. The predictive scheduling algorithm may be pre-preprogrammed with one or more predetermined values of N to choose between, and/or may use data collected during previous sequences 100 to set N to an optimal value for a given application. Moreover, N may be determined at least in part according to an expected number of sessions required for the task that is to be implemented by the session sequence 100. Furthermore, N may be determined according to an anticipated proportion of incorrect predictions for the plurality of sessions in the session sequence 100. The anticipated proportion of incorrect predictions may, for instance, be determined according to the aforementioned data on previous sequences and/or may be pre-programmed into the algorithm. The predictive scheduling algorithm can, for example, use the anticipated proportion of incorrect predictions to choose a value of N that keeps the probability of buffer flush operations at or below an acceptable level.

As part of determining the predicted order, the predictive scheduling algorithm may determine a start time of at least one predicted session in the predicted order according to a start time and a run time of at least one preceding predicted session in the predicted order. This can allow the scheduler to know not only the order in which the sessions are predicted to appear in the sequence, but also the start time of each session. In order to produce the predicted order, the predictive scheduling algorithm may add predicted sessions to the predicted order until the number of predicted sessions in the predicted order reaches the value of N as noted above, or until a condition is reached in which a run time of a next predicted session cannot be determined.

Figure 4:
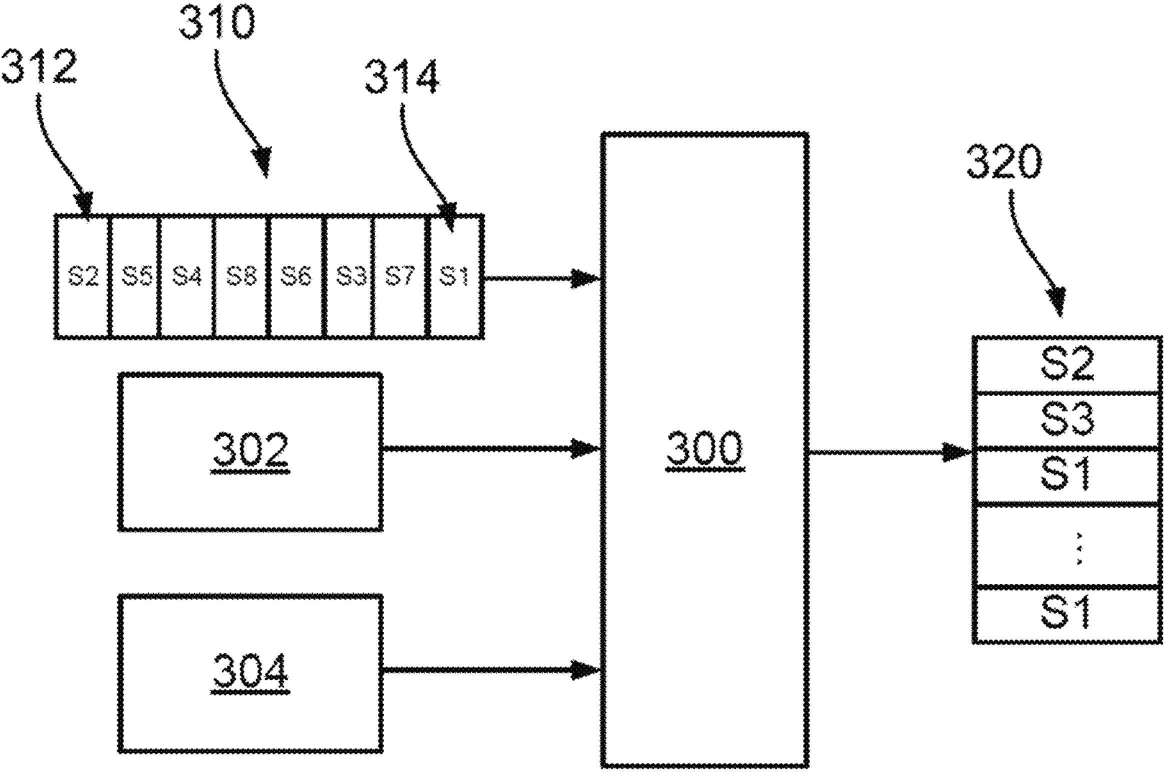
FIG. 4 illustrates the operation of a scheduler according to an embodiment of this disclosure.

Turning now to FIGS. 4 and 5, further details of the operation of the scheduler will now be described.

FIG. 4 illustrates the operation of a scheduler according to an embodiment of this disclosure. In FIG. 4, the predictive scheduling algorithm 300 stores the sessions of the predicted order in the circular buffer 320 as already noted above.

In this embodiment, the predictive scheduling algorithm 300 has a number of inputs to use when determining the predicted order. These inputs include an indication 302 of the current time, and also an indication 304 of the start time and the runtime of the preceding session S in the predicted order for the sequence 100. The inputs in this embodiment also include a session list 310. The session list 310 lists the sessions that may, in principle, be included in the sequence 100. These sessions are listed in the session list in (e.g., descending) order of dynamic priority. It will be appreciated that the constituents and ordering within the session list may vary dynamically, according to the presently available information regarding the sequence 100, such as the current location in the sequence and/or whether any sessions are to be added/removed etc. following a buffer flush operation. In the example shown in FIG. 4, the session list 310 lists the session in descending order of priority, from the lowest priority session 312 to the highest priority session 314.

In one embodiment, the prediction of which session will appear first in the predicted order is made using the current time indication 302. Subsequent predictions as to a next session in the predicted order are made using the indication 304 of the start time and the runtime of the preceding session S in the predicted order.

For example, if the first prediction is for S2 then S2 is predicted using the current time, the 2nd prediction is made by passing the S2 start time+S2 run time as the current time and similarly the 3rd prediction is made by passing start time+run time of the session predicted in the 2nd prediction. This methodology may continue until N is reached, as noted above. Alternatively, the methodology may continue until the scheduler encounters a condition where runtime of the previous session in the predicted order cannot be predicted as in the case of un-synced controlee sessions. Un-synced controlee session can mean that the maximum run time which is Rx search window can be two times the block duration or less if synced before that. In UWB, run time is dependent on the ranging or radar protocol and its configuration. For example, in the case of Double-Sided Two-Way Ranging (DS-TWR) protocol in deferred mode with one responder, it may take minimum 5 slots of run time and it can go up to 20 slots in a worst-case scenario with 8 responders and optional ranging results message is enabled.

In accordance with embodiments of this disclosure, there may be provided a computer program comprising program instructions which, when executed by a scheduler, cause the scheduler to perform a method of the kind described above in relation to FIG. 5.

In accordance with embodiments of this disclosure, there may be provided a scheduler that is operable to schedule sessions in a communications system (e.g., a UWB system) by performing a method of the kind described above in relation to FIG. 5. In accordance with embodiments of this disclosure, there may be provided a communications system (e.g., a UWB system) including such a scheduler.

Accordingly, there has been described a method of scheduling sessions in an Ultra-wideband, UWB, communications system, and a corresponding computer program, scheduler and UWB communications system. The method includes using a predictive scheduling algorithm to produce a predicted order of appearance of a plurality of UWB sessions in a UWB session sequence. The method also includes storing the predicted order in a buffer. The method further includes performing a plurality of iterations of: on completion of a preceding UWB session in the UWB session sequence, inspecting the buffer to determine a next UWB session in the UWB session sequence; and initiating that next UWB session.

Although particular embodiments of the disclosure have been described, it will be appreciated that many modifications/additions and/or substitutions may be made within the scope of the claims.

What is claimed is:

1. A method of scheduling sessions in an Ultra-wideband (UWB) communications system, the method comprising:

using a predictive scheduling algorithm to produce a predicted order of appearance of a plurality of UWB sessions in a UWB session sequence;

storing the predicted order in a buffer; and performing a plurality of iterations of:

on completion of a preceding UWB session in the UWB session sequence, inspecting the buffer to determine a next UWB session in the UWB session sequence; and initiating said next UWB session.

2. The method of claim 1, comprising producing the predicted order during a session time of a UWB session.

3. The method of claim 2, in which the predictive scheduling algorithm is run in a real-time operating system (RTOS) thread that has a lower priority than at least one functional thread of the UWB communications system.

4. The method of claim 1, in which the inspection of the buffer and the initiating of the next UWB session is performed in a time gap located between completion of the preceding UWB session and commencement of the next UWB session.

5. The method of claim 1, wherein initiating said next UWB session comprises at least one of:

resetting a modem of the UWB communications system;

changing a channel to be used for transmission/reception by the next UWB session in response to a determination that the next UWB session requires a different channel to be used than a channel used by the preceding UWB session; and preparing a transmitter and/or receiver of the UWB communications system.

6. The method of claim 1, further comprising, prior to determining the predicted order, determining a number (N) of predicted UWB sessions to include in the predicted order.

7. The method of claim 6, in which the number N is determined according to an expected number of UWB sessions required for a task that is to be implemented by the UWB session sequence.

8. The method of claim 6, in which the number N is determined according to an anticipated proportion of incorrect predictions for the plurality of UWB sessions in the UWB session sequence.

9. The method of claim 6, in which determining the predicted order comprises adding predicted UWB sessions to the predicted order until the number of predicted UWB sessions in the predicted order reaches the number N, or until a condition is reached in which a run time of a next predicted UWB session cannot be determined.

10. The method of claim 1, wherein determining the predicted order comprises determining a start time of at least one predicted UWB session in the predicted order according to a start time and a run time of at least one preceding predicted UWB session in the predicted order.

11. The method of claim 1, further comprising flushing the buffer and producing a new predicted order in response to a determination that:

an actual next UWB session in the UWB session sequence differs from a next predicted UWB session in the predicted order;

a new UWB session is to be added to the UWB session sequence;

a UWB session is to be removed from the UWB session sequence; or a runtime of one of more UWB sessions in the UWB session sequence has changed.

12. The method of claim 1, wherein the buffer is a circular buffer.

13. A non-transitory computer-readable medium encoded with a computer program comprising program instructions which, when executed by a scheduler, cause the scheduler to perform a method a method of scheduling sessions in an Ultra-wideband (UWB) communications system, the method comprising:

using a predictive scheduling algorithm to produce a predicted order of appearance of a plurality of UWB sessions in a UWB session sequence;

storing the predicted order in a buffer; and performing a plurality of iterations of:

on completion of a preceding UWB session in the UWB session sequence, inspecting the buffer to determine a next UWB session in the UWB session sequence; and initiating said next UWB session.

14. The non-transitory computer-readable medium of claim 13, wherein the program instructions further cause the scheduler to produce the predicted order during a session time of a UWB session.

15. The non-transitory computer-readable medium of claim 13, wherein the program instructions further cause the scheduler to, prior to determining the predicted order, determine a number (N) of predicted UWB sessions to include in the predicted order.

16. The non-transitory computer-readable medium of claim 13, wherein the program instructions further cause the scheduler to flush the buffer and produce a new predicted order in response to a determination that:

an actual next UWB session in the UWB session sequence differs from a next predicted UWB session in the predicted order;

a new UWB session is to be added to the UWB session sequence;

a UWB session is to be removed from the UWB session sequence; or a runtime of one of more UWB sessions in the UWB session sequence has changed.

17. A scheduler operable to schedule sessions in an Ultra-wideband (UWB) communications system, the scheduler including processor-readable instructions stored in a non-transitory storage medium of the UWB communications system, the processor-readable instructions, when executed, cause the processor to perform a method of scheduling comprising by:

using a predictive scheduling algorithm to produce a predicted order of appearance of a plurality of UWB sessions in a UWB session sequence;

storing the predicted order in a buffer; and performing a plurality of iterations of:

on completion of a preceding UWB session in the UWB session sequence, inspecting the buffer to determine a next UWB session in the UWB session sequence; and initiating said next UWB session.

18. The scheduler of claim 17, wherein the method of scheduling further comprises producing the predicted order during a session time of a UWB session.

19. The scheduler of claim 17, wherein the method of scheduling further comprises, prior to determining the predicted order, determining a number (N) of predicted UWB sessions to include in the predicted order.

20. The scheduler of claim 17, wherein the method of scheduling further comprises flushing the buffer and producing a new predicted order in response to a determination that:

an actual next UWB session in the UWB session sequence differs from a next predicted UWB session in the predicted order;

a new UWB session is to be added to the UWB session sequence;

a UWB session is to be removed from the UWB session sequence; or a runtime of one of more UWB sessions in the UWB session sequence has changed.

* * * * *